United States Patent

[11] 3,610,755

| [72] | Inventors | Heimrich Wieberger<br>Eschelbronn;<br>Walther Hess, Dilsberg-Neuhof, both of<br>Germany |
|------|-----------|---|
| [21] | Appl. No. | 794,228 |
| [22] | Filed | Jan. 27, 1969 |
| [45] | Patented | Oct. 5, 1971 |
| [73] | Assignee | Eltro GmbH & Co.<br>Heidelberg, Germany |
| [32] | Priority | Feb. 15, 1968 |
| [33] |  | Germany |
| [31] |  | P 16 73 905.2 |

[54] OPTICAL SIGHTING AND/OR OBSERVATION SET COMBINED WITH A LASER TELEMETRY UNIT
16 Claims, 8 Drawing Figs.

| [52] | U.S. Cl. | 356/4, 250/199 |
|------|----------|----------------|
| [51] | Int. Cl. | G01c 3/08 |
| [50] | Field of Search | 350/96, 96 B; 356/4; 250/199 |

[56] References Cited
UNITED STATES PATENTS

| 3,354,404 | 11/1967 | Boyle et al. | 350/96 |
| 3,395,366 | 7/1968 | Snitzer et al. | 350/96 |
| 3,434,776 | 3/1969 | Kern | 350/96 |
| 3,464,770 | 9/1969 | Schmidt | 356/4 |
| 3,471,215 | 10/1969 | Snitzer | 350/96 |
| 3,508,807 | 4/1970 | Mayer | 350/96 B |

*Primary Examiner*—Rodney D. Bennett, Jr.
*Assistant Examiner*—S. C. Buczinski
*Attorney*—Waters, Roditi, Schwartz & Nissen

ABSTRACT: Apparatus is provided including a laser telemetry unit and a set of objectives adapted for visual target sighting and for laser transmission and reception, there being provided in accordance with the invention a flexible light conducting means optically coupling the objectives and telemetry means. This light conducting means consists at least in part of a single light conducting fiber associated with each objective employed and adapted for conveying transmitted laser pulses to the corresponding objective and for conveying laser echo pulses from the corresponding objective to the appropriate unit in the telemetry unit.

OPTICAL SIGHTING AND/OR OBSERVATION SET COMBINED WITH A LASER TELEMETRY UNIT

DRAWING

FIGS. 1-3 respectively show, in diagrammatic form, different possible arrangements for coupling a laser transmitter to a laser transmitting objective;

FIG. 4 diagrammatically illustrates a cross section converter using glass-fiber optics, as in the arrangement of FIG. 3;

FIG. 5 diagrammatically illustrates an arrangement for coupling a laser receiver to a laser receiving objective;

FIG. 6 is an overall schematic illustration of an optical sighting and/or observation set combined with a laser telemeter;

FIG. 7 diagrammatically illustrates, in accordance with the invention, an arrangement in which the objective of a sighting and/or observation set is identical to the laser transmitting objective; and FIG. 8 diagrammatically illustrates, in accordance with the invention, yet another arrangement in which the objective of the sighting and/or observation set is identical to the laser receiving objective.

DETAILED DESCRIPTION

Figure 1:
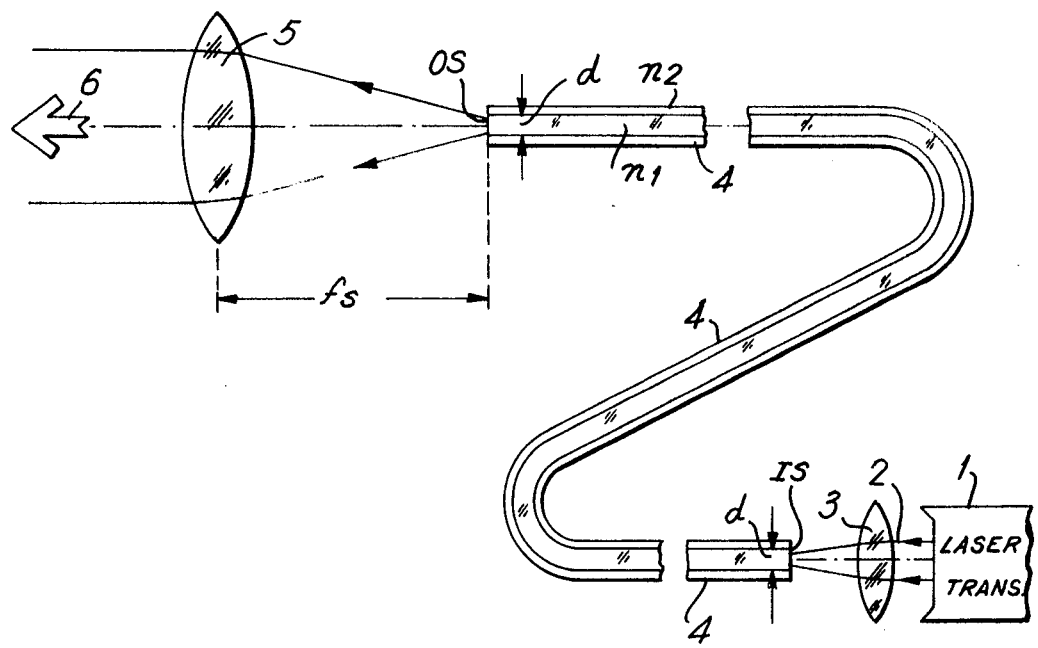

This invention relates to optical sighting and/or observation sets combined with laser telemetry units, and more particularly to equipment having one objective for a beam path for sighting or observation, one laser-transmitter objective and one laser-receiver objective.

According to the invention, the equipment package containing the objectives and the associated system of optics for sighting and/or observation is coupled to the laser transmitter and to the laser receiver respectively, by means of flexible photoconductor systems.

An assembly or installation of the elements of a laser telemetry unit in combination with an optical sighting and/or observation set, for use in armored vehicles or in aircraft, encounters problems primarily of a structural nature because normally there is insufficient space in the vicinity of the sighting and/or observation set or inside this set itself for accommodating a laser telemetry unit.

An object of the invention is to eliminate such difficulties completely, and this object is achieved since on the basis of the invention it becomes possible, without difficulty, to avoid the direct combination of the particularly bulky components of the laser telemetry unit and the elements of the optical sighting and/or observation set inside a common housing package. According to the invention it is possible to arrange the different assembly groups in separate spaces. Only the laser transmitting and receiving objectives are combined with the optical system of the sighting and/or observation set inside the sight housing.

The invention and its specific developments are next explained below in detail with reference to the drawing.

As is known, a laser telemeter operates on the principle of measuring the round-trip transit time of short light impulses furnished by a laser transmitter. The echo impulses bounced off a target to be telemetered are returned to laser receiver through receiving optics of high luminosity. The receiving optics are generally designed in such a manner that light signals can be received only from directions lying within a receiving cone of relatively small opening angle. After the filtering out of undesirable wavelengths, the echo impulses passing the receiving filter are received by a photomultiplier provided with a subsequent amplifier. The amplified echo signals are finally supplied to an evaluation electronics circuit which furnishes digital display of the measuring result, i.e., the distance sought.

In the following explanation of the invention, the individual elements of a laser transmitter for telemetry purposes are considered to be known. The term laser transmitter is interpreted as comprising the active system for the generation of laser impulses. The most important element of a laser transmitter for telemetry is a giant impulse laser in a Q circuit, with which light impulses of an average output value of, for example, 1 mw. can be generated.

Figure 2:
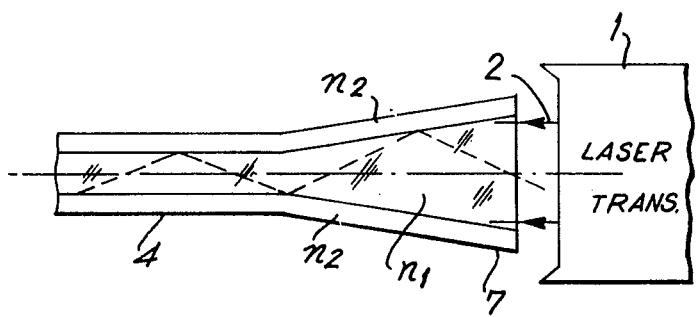
Figure 3:
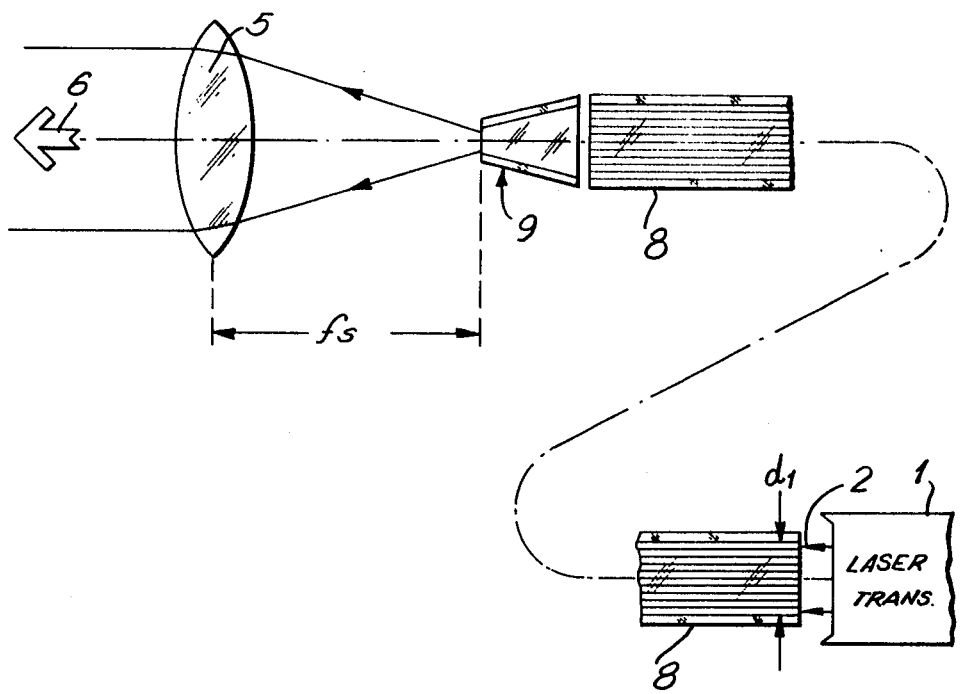

In FIGS. 1-3, a laser transmitter devised as a complete assembly is indicated at 1 and, for the sake of simplification, only the output side of this laser transmitter 1 is represented. This entire unit is, for example, installed in any convenient location in an armored vehicle.

The light impulses 2 emitted by the laser transmitter 1 according to FIG. 1 are beamed to the input-side IS of core cross section 4 of a flexible glass-fiber photoconductor through focusing optics 3. In this example, element 4 is a single glass-fiber unit by means of which an optical connection between the laser transmitter 1 and the transmitting objective 5 is realized.

The transmitting objective 5 is, for example, located at the lookout head of an optical sighting device designed as a periscope. The output-side end OS of the photo-conductor glass-fiber 4 is brought to the focal plane of the transmitting objective 5, the focal length of which is designated as $f_S$. Thereby, the full rated output of the laser transmitter can be projected through the transmitting objective 5 as a transmission beam 6 with a high degree of collimation.

If the diameter of the photoconducting fiber core is designated as $d$, then $$\Phi \approx d/f_S$$

for the divergence of the transmission rays.

By the choice of a very small diameter $d$ of the fibercore it is assured that the original degree of collimation of the laser beam 2 will not be lost.

With values for $d$ of, for example, 50 $\mu$m. to 100 $\mu$m., and for an $f_S$ of from 5 cm. to 10 cm., there results:

transmission ray divergence $\Phi = 1$ mrad.

The diameter of the transmitting objective 5 is so chosen in this arrangement that no losses of transmitted laser energy can occur between the beam exit opening of the photoconductor fiber 4 in the focal plane of the objective and in the objective itself.

In a manner known per se, the photoconductor fiber 4 is constructed from a core having the refraction index $n_1$ and a jacket having the refraction index $n_2$, different from $n_1$. As materials for the fiber core and fiber jacket, there are used types of glass which present practically no absorption of the laser wavelength in question.

On the basis of FIGS. 2 and 3, there will next be discussed further embodiments of the optical coupling of the laser-transmitter output to the transmitting objective. The embodiment according to FIG. 2 differs from the one shown in FIG. 1 essentially in that the end 7 of the photoconductor fiber 4 facing the transmitter 1 widens in conical meridianal section up to a diameter which is adapted to the laser beam emanating from the laser transmitter 1. By such a widening of the fiber end 7 on the beam entrance side, a larger cross section of the air-glass interface is obtained so that the specific surface loading of the fiber end of the laser output is decreased. Thus, the risk of damage to the photoconductor fiber is reduced accordingly. The widened cross section of the fiber end 7 also assures against any loss of output energy from the laser transmitter in transition to the photoconductor fiber 4 so that the use of focusing optics can be dispensed with. The further configuration of the photoconductor system corresponds to the embodiment of FIG. 1.

Figure 4:
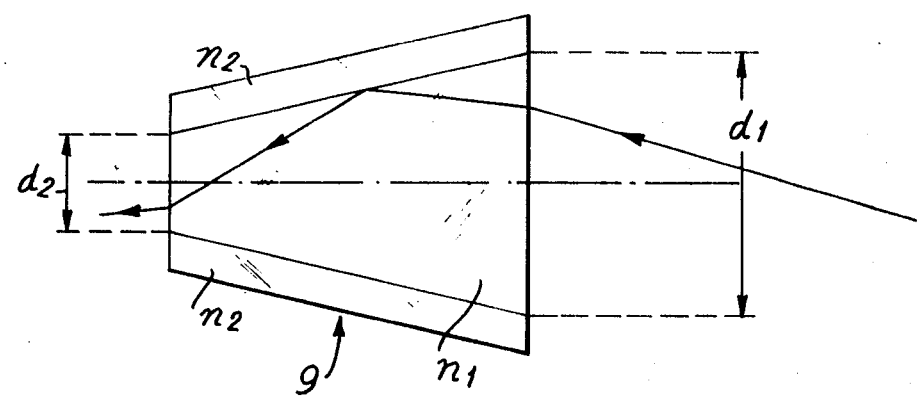

In the further embodiment shown in FIG. 3, the original cross section of the bundle of rays issuing from the laser transmitter is maintained along the entire transitory beam path and modified only in proximity of the transmitting objective 5. For this purpose there is provided a system of optical coupling of the laser transmitter 1 to the transmitting objective 5 consisting of a flexible stem 8 of bundled photoconductor fibers and a subsequent short single fiber 9 of conical meridianal section. The diameter $d_1$ of the photoconductor stem 8 is adapted to the diameter of the laser beam 2 emanating from the laser transmitter 1. The beam entrance end of the single fiber 9, which acts as a cross-sectional converter, possesses the identical diameter $d_1$, whereas the end of the single fiber 9 leading into the focal plane of the transmitting objective 5 has a diameter $d_2 << d_1$. The single fiber 9 is also shown in FIG. 4, but in enlarged longitudinal section. It is seen that the component consists of a core with the refraction index $n_1$, and a jacket with the refraction index $n_2$.

The tapering down of the ray bundle cross section proceeds inside the single fiber 9 with multiple total reflection from the conically converging core jacket interfaces so that, at the output of the cross-sectional converter, a practically punctiform light source is obtained. The light is then projected to infinity by the transmitting objective 5. Thereby, the required small angle of divergence Φ of the transmission beams is assured.

An advantage of such an arrangement consists of the fact that the single fiber 9, in the possible case of its becoming damaged due to the high specific radiation load at its narrow diameter end, can be easily replaced, since it constitutes only a relatively short piece of the total photoconductor system. Moreover, a focusing lens between laser transmitter 1 and the ray entrance opening of fiber stem 8, can again be dispensed with.

Figure 5:
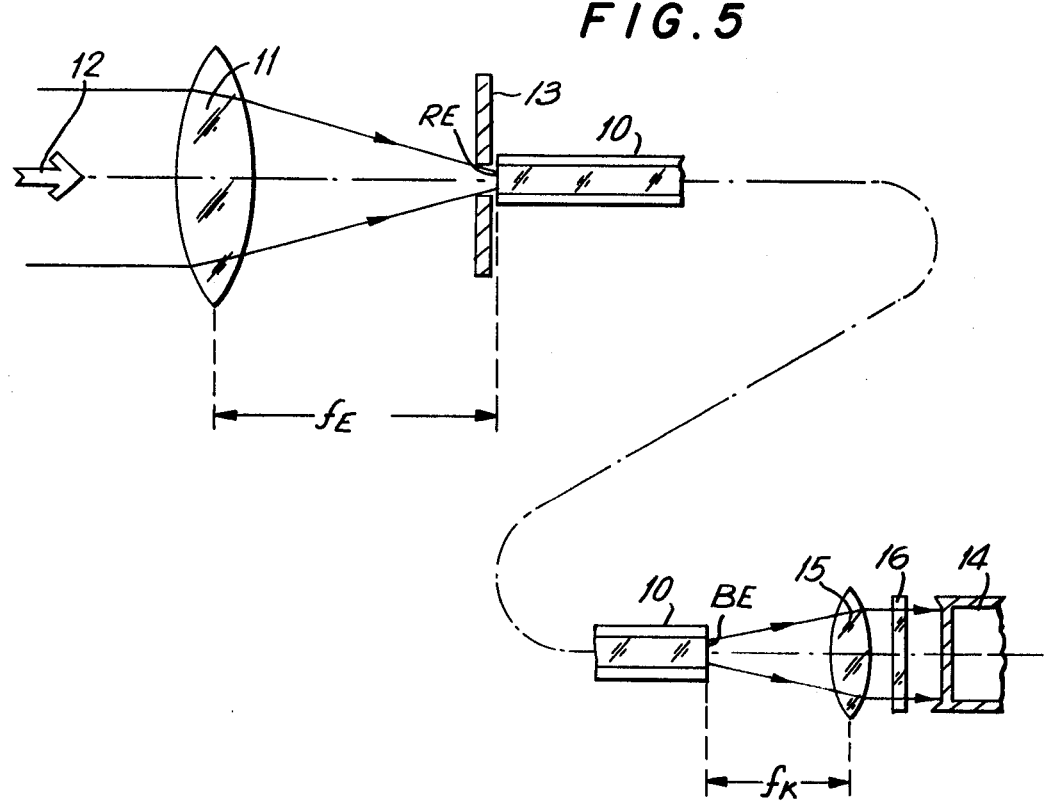

The laser receiver, which in a known manner essentially contains a photomultiplier and a subsequent amplifier, as well as possibly some of the elements of the subsequent evaluation circuit, and which can either form an assembly group of its own or can be packaged together with the complete evaluation electronics, the power supply and, if desired, also with the assembly group of the laser transmitter, can again be coupled to the laser receiving objective 11 by a single flexible photoconductor fiber, as can be seen in FIG. 5.

The ray entrance surface RE of the photoconductor fiber 10 is located in the focal plane of the receiving objective 11, the focal length of which is designated as $f_E$. The diameter of the fiber 10 is adapted to the opening of a field-of-vision diaphragm 13, which limits the field of vision angle of the receiving objective 11. It is also possible to utilize the ray entrance side of the fiber 10 itself as the field-of-vision diaphragm. The reception beam (laser echo impulse) is indicated at 12.

The end BE of the photoconductor fiber 10 facing the laser receiver 14 terminates with its beam exit surface in the focal plane of a collimator lens 15 inserted in front of the laser receiver 14, which has a focal length $f_K$ and conducts the beam of received radiation emanating from the fiber 10 via a special filter 16 of the photocathode of a photomultiplier contained in the laser receiver 14.

In modification of the system shown in FIG. 5, it is possible, as well, to let the end of the photoconductor fiber 10 facing the laser receiver widen in conical meridianal section up to a diameter adapted to the diameter of the photocathode of the photomultiplier.

Moreover, the optical coupling between the laser receiver 14 and the laser receiving objective 11 can be handled by a stem of bundled photoconductor fibers, whose beam-entrance end is located in, or before, the focal plane of the receiving objective 11, and possesses a diameter adapted to that of a correspondingly arranged field-of-vision diaphragm, whereas the beam-exit end of the stem is located in, or in front of the focal plane of a collimating lens preceding the laser receiver. In this arrangement, the collimator lens can finally be replaced by a fiber-optical cross-sectional converter, as shown in FIG. 4. The side of this converter, which connects to the photoconductor fiber stem in this arrangement, has a diameter identical to that of the stem, whereas the end of the cross-sectional converter facing the laser receiver widens to a diameter which is adapted to that of the photocathode of the photomultiplier contained in the laser receiver.

Figure 6:
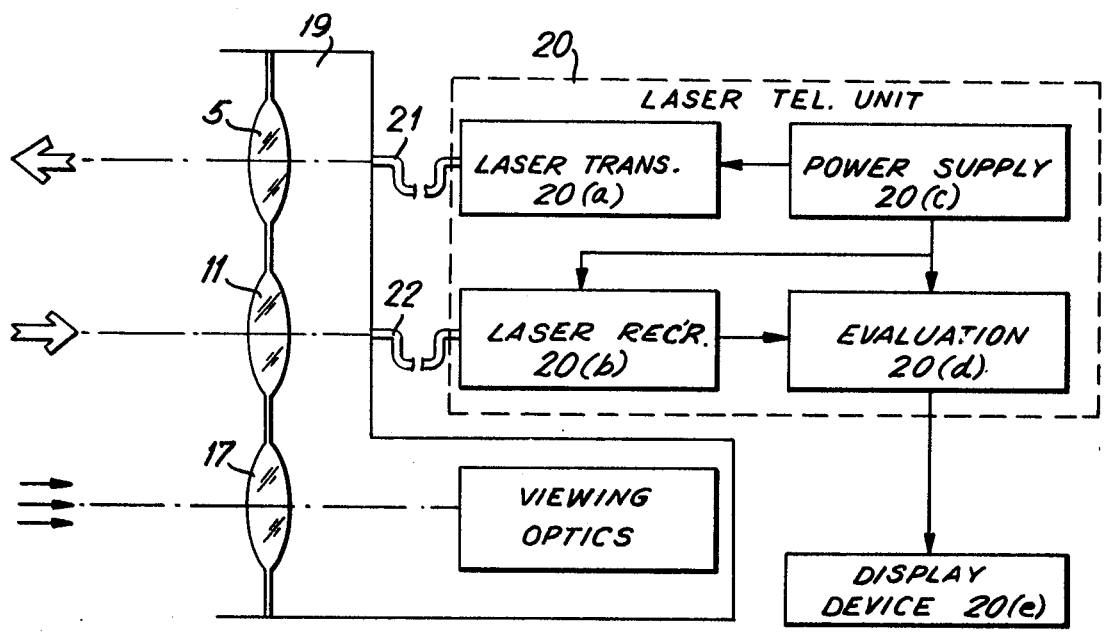

FIG. 6 shows, in an overall schematic, the disposition of an optical sighting and/or observation set combined with a laser telemetry unit. This set contains, in its lookout head 19, the laser transmitting objective 5, the laser receiving objective 11, and the objective 17 for the sighting-and-observation beam path, as well as a viewing ocular cooperating with the objective 17.

The optical axes of the three objectives 5, 11 and 17 are in parallel alignment with each other. The entire laser telemetry unit consisting of laser transmitter 20 (a), laser receiver 20(b), power supply 20(c) and evaluation of utilization circuit 20(d) can be arranged at a discrete location at a distance of several meters from the sighting and/or observation set. The display device 20(e) following the evaluation circuit can in turn be arranged in some other place most convenient for the observer, and even in closest proximity to the viewing optics.

The laser telemetry unit 20 is coupled to the optical lookout head 19 by two flexible photoconductor systems 21 and 22. On connection is made from the laser transmitter 20(a) to the transmitting objective 5 through the photoconductor system 21, and a second connection from the receiving objective 11 to the laser receiver 20(b) by the photoconductor system 22.

Figure 7:
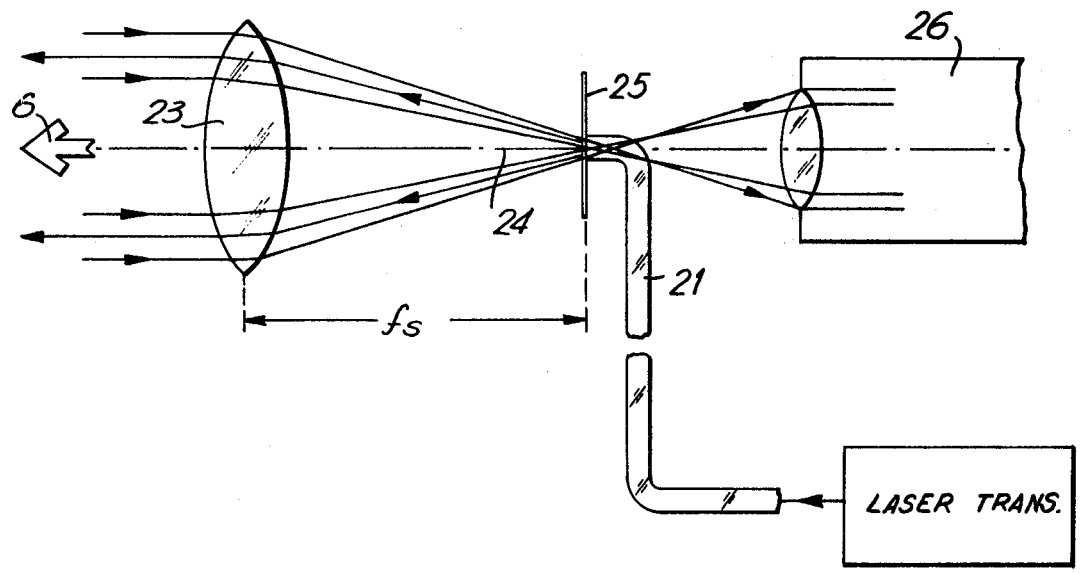
Figure 8:
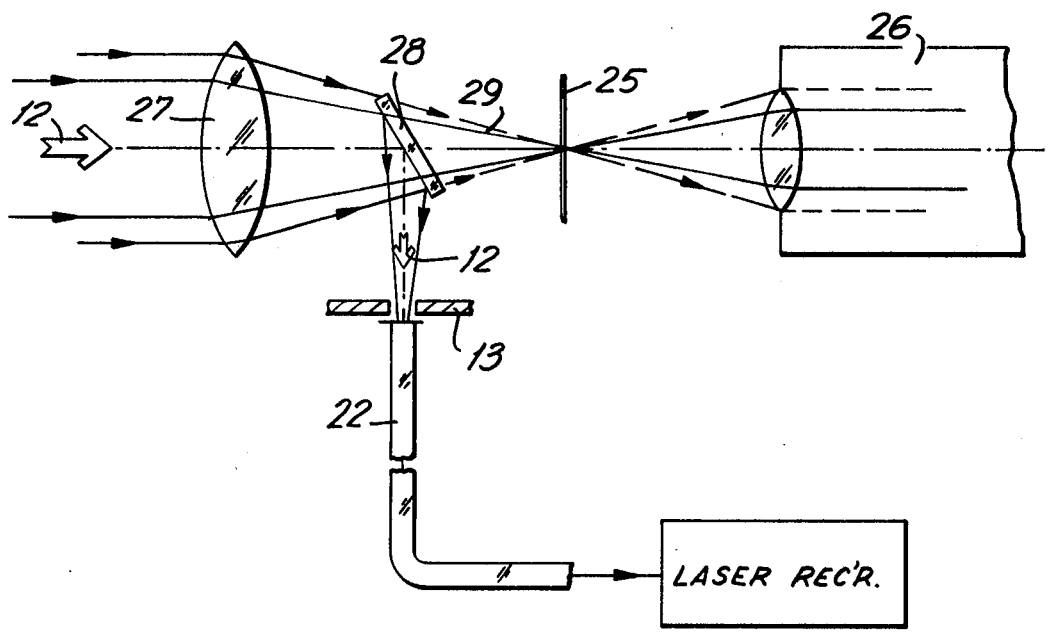

FIGS. 7 and 8 show additional advantageous embodiments. In FIG. 7 the optics of the lookout head 19 have been modified in such a manner that the objective 17 of FIG. 6 includes transmitting objective 5; i.e., an objective 23 is provided which serves as the entrance objective for the beam path of sighting and observation, and also as transmitting objective for the projection of the transmitter beam 6.

A configuration, which is particularly simple and advantageous from the point of view of design as well as from that of practical utilization, consists in bringing a photoconductor system 21, consisting of a single fiber strand and forming the connection to the laser transmitter, into the focal plane of the objective 23 and fixing its end onto the optical axis 24 in the center of the reticle 25 so that, in sighting, the fiber may simultaneously be aimed at the target. This individual fiber strand is thin enough that the sighting and observing operations are not disturbed.

FIG. 8 finally shows an arrangement in which the optics of the lookout head of housing 19, as per FIG. 6, have been modified in such a manner that the objective 17 pertaining to the optics for sighting and/or observation is identical to the laser receiving objective 11.

The lookout head 19 contains an objective 27, which serves simultaneously as entrance objective for the beam path of sighting and observation and as entrance objective for the laser echo beam 12 which, inside the unit, by means of a dielectric beam divider 28 is mirrored away from the beam path of sighting and observation. The target radiation 29 passed through the beam divider 28 is focused in one focal plane of objective 27, in which the reticle is located. The laser reception beam 12, deflected by 90°, reaches the second focal plane of the objective 27 and enters behind the field-of-vision diaphragm 13 into the entrance aperture of the photoconductor system 22 which conducts the received laser echo beam further to the laser receiver.

The invention, whose possible practical realizations are by no means limited to the embodiments shown in the drawing, makes possible the installation of sighting and/or observation sets in combination with a laser telemetry unit provided in accordance with the invention. This is important for example, in armored vehicles, where the space availability is highly critical because, for example, in the turret more space is not required than is usually available for accommodating a sighting telescope, whereas the assembly groups of the laser telemetry equipment can, at will, be located at those places in the vehicle which are capable of accommodating items which, on account of their volume and/or their weight, raise particular problems for installation in a vehicle.

What is claimed is:

1. Apparatus including the optical system of a target sighting and observing device, comprising at least two objectives adapted for target sighting and laser beam transmission and reception, laser telemetry means, housing means, said housing means encompassing and forming a common support structure for said objectives and said optical system remote from said laser a telemetry means, said optical system including flexible light conducting means optically coupling said objectives and telemetry means.

2. Apparatus as claimed in claim 1, wherein said light conducting means includes a single light conducting fiber associated with each said objective.

3. Apparatus as claimed in claim 2 comprising three said objectives respectively adapted for target sighting, laser beam transmission and laser echo reception.

4. Apparatus as claimed in claim 2 comprising two said objectives, one of which is adapted for target sighting and laser beam transmission and the other for laser echo reception.

5. Apparatus as claimed in claim 2 comprising two said objectives, one of which is adapted for target sighting and laser echo reception and the other for laser beam transmission.

6. Apparatus as claimed in claim 2, wherein each said fiber includes an end in a focal plane of one of said objectives.

7. Apparatus as claimed in claim 2, wherein at least one said fiber includes an end spaced from a focal plane and one of said objectives, comprising a tapered fiber between said end and focal plane.

8. Apparatus as claimed in claim 2, wherein at least one of said fiber includes a tapered end portion.

9. Apparatus as claimed in claim 8, wherein the tapered end portion is adjacent said telemetry means.

10. Apparatus as claimed in claim 9, wherein said telemetry means includes a laser transmitter adapted to transmit a laser beam having a determined diameter, the tapered end portion flaring to approximately said diameter.

11. Apparatus as claimed in claim 1, wherein said light conducting means comprises flexible stranded fibers and a single fiber in series with the first said fibers.

12. Apparatus as claimed in claim 1, wherein said telemetry means includes target viewing optics, a laser beam transmitter and a laser echo receiver optically associated with said objectives, and means coupled to said transmitter and receiver to calculate and indicate the distance of the target.

13. Apparatus as claimed in claim 12 comprising two said objectives respectively adapted for laser beam transmission and reception and one of which is further adapted for target sighting and a beam splitter means associated optically with said one objective to direct light from the latter to said viewing optics and to said transmitter or receiver.

14. Apparatus as claimed in claim 1 comprising a reticle between at least one of said objectives and said light conducting means.

15. Apparatus as claimed in claim 1 comprising a collimator between at least one of said objectives and said light conducting means.

16. Apparatus as claimed in claim 1, wherein said objectives are mounted on parallel axes relative to each other in said housing.